United States Patent [19]

Lyon

[11] Patent Number: 5,215,288
[45] Date of Patent: Jun. 1, 1993

[54] LOAD BAR FOR A VARIABLY POSITIONED BULKHEAD

[75] Inventor: R. Terry Lyon, Taylor Ridge, Ill.

[73] Assignee: Roadway Express, Inc., Akron, Ohio

[21] Appl. No.: 743,917

[22] Filed: Aug. 12, 1991

[51] Int. Cl.⁵ .................................................. B66F 3/00
[52] U.S. Cl. .................................. 254/133 A; 254/113; 254/116; 254/134
[58] Field of Search ................ 254/DIG. 4, 105, 113, 254/114, 116, 119, 133 A, 133 R, 134

[56] References Cited

U.S. PATENT DOCUMENTS

| | | | |
|---|---|---|---|
| 590,774 | 9/1897 | Rexroth | 254/133 A |
| 1,221,205 | 4/1917 | Moore et al. | 254/133 A |
| 1,231,462 | 6/1917 | Tutwiler | 254/133 A |
| 2,678,803 | 5/1954 | Wilkerson | 254/114 |
| 2,820,626 | 1/1958 | Hedeen | 254/113 |
| 3,995,565 | 12/1976 | Kersey | 254/133 A |
| 4,660,806 | 4/1987 | Masters | 254/134 |
| 4,901,989 | 2/1990 | Stellato | 269/17 |

Primary Examiner—J. J. Swann
Attorney, Agent, or Firm—Renner, Kenner, Greive, Bobak, Taylor & Weber

[57] ABSTRACT

A load bar (10) comprises a hollow main body (11) having a first and a second open end (21, 22). A first arm (12) is received through the first open end (21) of the main body (11), and is laterally movable therein. A second arm (13) is received through the second open end (22) of the main body and is also laterally movable therein. The positions of the first arm (12) and the second arm (13) with respect to the main body (11) and with respect to each other are releasably securable and adjustable. Also, a bulkhead is provided comprising a load bar (10) as above, and further comprising a header wall (80).

12 Claims, 3 Drawing Sheets

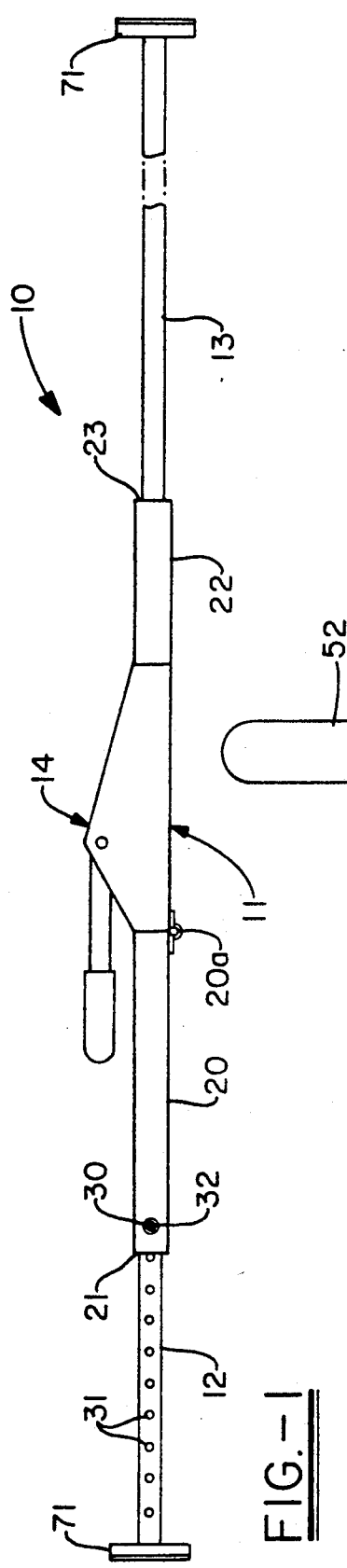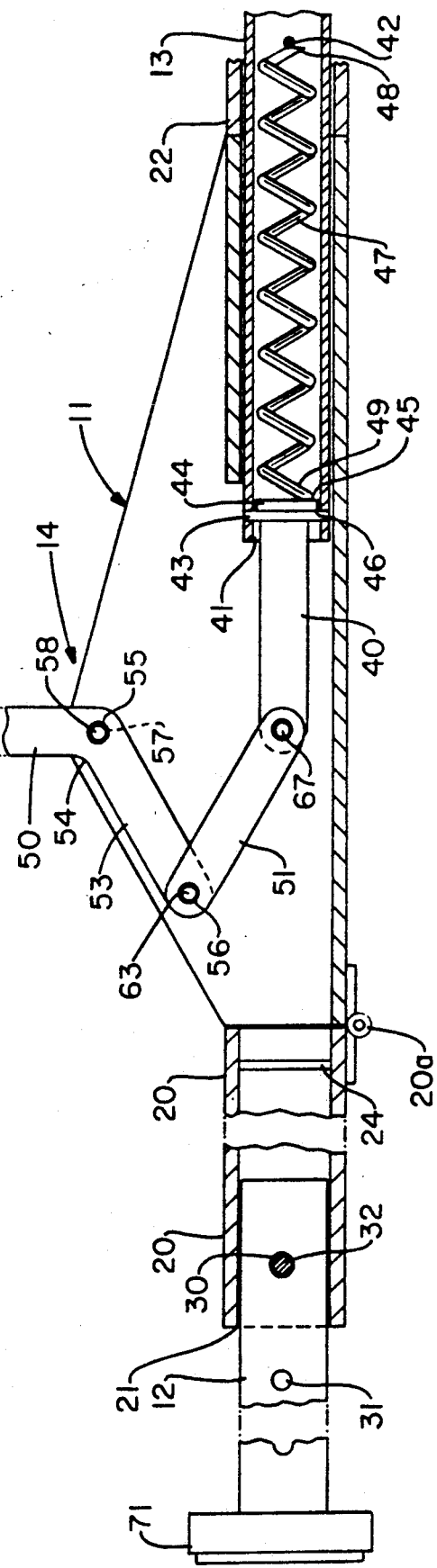
FIG.-1
FIG.-2

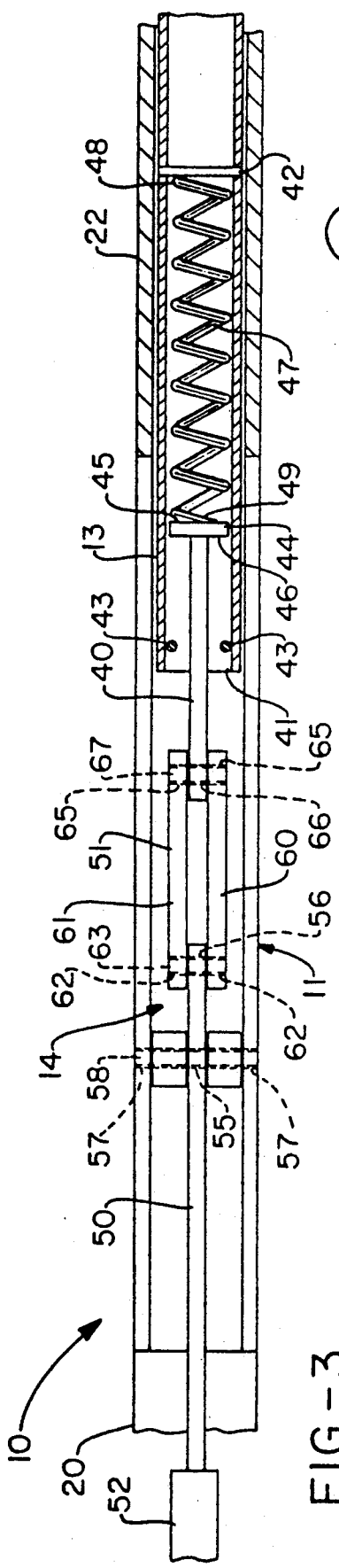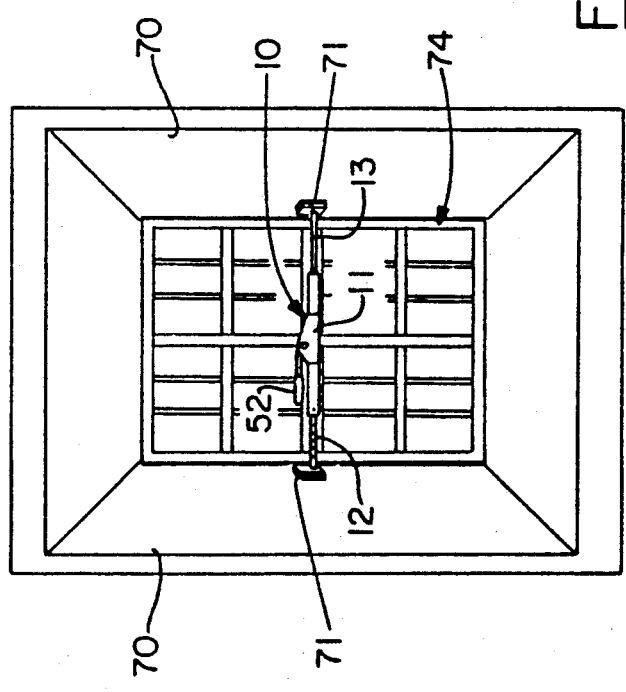

LOAD BAR FOR A VARIABLY POSITIONED BULKHEAD

TECHNICAL FIELD

The present invention is generally related to a bulkhead which can be variably positioned. More particularly, the present invention is directed toward a load bar for a variably positioned bulkhead. Specifically, the present invention is related to a load bar having a lever action, cinch lock.

BACKGROUND OF THE INVENTION

Variably positioned bulkheads are used in a variety of applications where a movable wall or restraining partition is needed. For instance, such bulkheads are often used in the trucking industry, where tractor-trailers are provided with trailer compartments for the transportation of large quantities of goods. Such goods are often irregularly packaged, and a given trailer may at any given time, haul a variety of items. More importantly, these items are often of differing weights independent of their size.

It is considered an important skill in the trucking art to load a trailer compartment so as to evenly distribute the weight of the load to be hauled. As is known, such trailer compartments generally have a lateral dimension which is much greater than its width. If one side of the compartment is overloaded, the tractor-trailer may prove to be unstable, which is a dangerous condition. This problem is most acute when transported goods are of differing sizes and when a trailer compartment is less than completely full. Loose articles would likely be tossed around the trailer compartment during transit, which could dangerously shift the weight distribution, and which could also damage the goods themselves. A loader must be careful to distribute the weight evenly and securely.

To this end, variably positioned bulkheads are often employed. The loader will place a number of articles, often of similar size, so that the weight of the articles are evenly distributed from one side of the trailer compartment to the other, along the trailer's width. A bulkhead is then positioned close to and even in contact with these articles, and secured in position. The bulkhead prevents the articles from shifting during transit. A plurality of bulkheads may be employed with a given trailer compartment, depending upon the goods to be hauled.

A truck driver is often provided with a tractor-trailer which is completely loaded with goods to be delivered. He then drives a predetermined route, unloading the goods along the way, often making several stops. The driver must repeatedly remove and reposition the bulkheads as many times. Therefore, the portable bulkhead must be capable of being manipulated and positioned by the truck driver with minimal or no help.

Variably positioned bulkheads used in the trucking industry will usually span the width of the trailer compartment, and are secured on the sidewalls of the compartment. They must be secured strongly enough to prevent shifting of heavy objects, and yet be portable and easy to use and secure because of the considerations described above.

It is known in the art to provide such bulkheads with an adjustable load bar. The load bar spans the width of the trailer and is adjustable toward the sidewalls of the trailer, so as to create a secure pressure fit. The load bar may be affixed to an actual bulkhead wall, it may have loops extending therefrom, or it may be employed simply as a bar, all of which will serve to prevent cargo shift.

The mechanisms to adjust the pressure fit of the load bars known in the art include one having an automobile style jack. By repeatedly actuating a handle, a rocker clutch is caused to move along a series of steps. This in turn causes one side of the load bar to move toward the trailer compartment sidewall, until a pressure fit is achieved.

The automobile jack style of load bar adjustor has proven to have many drawbacks. These drawbacks include those common to the automobile jack art itself. These jack devices are difficult and time consuming to operate, and they are known to be prone to slipping. A load bar equipped with such an adjusting device must be held with one side of the bar against one side of the trailer compartment sidewall, while the jack is repeatedly manipulated so as to cause the other end of the bar to engage the sidewall. This is a difficult maneuver at best, and virtually impossible for one person to accomplish alone.

Therefore, a need exists for a load bar for use as or with a variably positioned bulkhead, which has a positive adjusting and locking mechanism and which can be easily and quickly manipulated by the operator thereof.

SUMMARY OF THE INVENTION

It is therefore, an aspect of the present invention to provide a load bar for use as or with a variably positioned bulkhead.

It is another aspect of the present invention to provide a load bar as above, which can be easily and quickly manipulated by an operator.

It is a further aspect of the present invention to provide a load bar as above, which has a positive adjusting locking mechanism to prevent slippage.

These and other aspect of the present invention, as well as the advantages thereof over existing prior art forms, which will become apparent from the description to follow, are accomplished by the means hereinafter described and claimed.

In general, a load bar comprises a hollow main body having a first and a second open end. A first arm is received through the first open end of the main body and is laterally movable within the main body. A second arm is received through the second open end of the main body and also is laterally movable within the main body. Means are provided to releasably secure and adjust the position of the first arm with respect to the main body. Means are also provided to releasably secure and adjust the position of the second arm with respect to the main body and with respect to the first arm.

Also, a bulkhead comprises a header wall and at least one load bar. The load bar has a hollow main body having a first and a second open end. A first arm is received through the first open end of the main body and is laterally movable within the main body. A second arm is received through the second open end of the main body and also is laterally movable within the main body. Means are provided to releasably secure and adjust the position of the first arm with respect to the main body. Means are also provided to releasably secure and adjust the position of the second arm with respect to the main body and with respect to the first arm.

A preferred load bar incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a perspective view of a load bar embodying the concepts of the present invention.

FIG. 2 is a break away view of the load bar of FIG. 1, showing the load bar without a header wall and showing the detail of a lever action cinch lock, and showing the cinch lock in the open position.

FIG. 3 is a top plan view of the load bar of FIG. 2, showing only a portion of the cinch lock mechanism, main housing and second arm.

FIG. 4 is a perspective view of the load bar and header wall of FIG. 1, as shown in use on the inside of a trailer compartment.

FIG. 6 is a front elevation view of a lever arm employed with the locking mechanism of the load bar of FIG. 1.

BEST MODE FOR CARRYING OUT THE INVENTION

Figure 5:
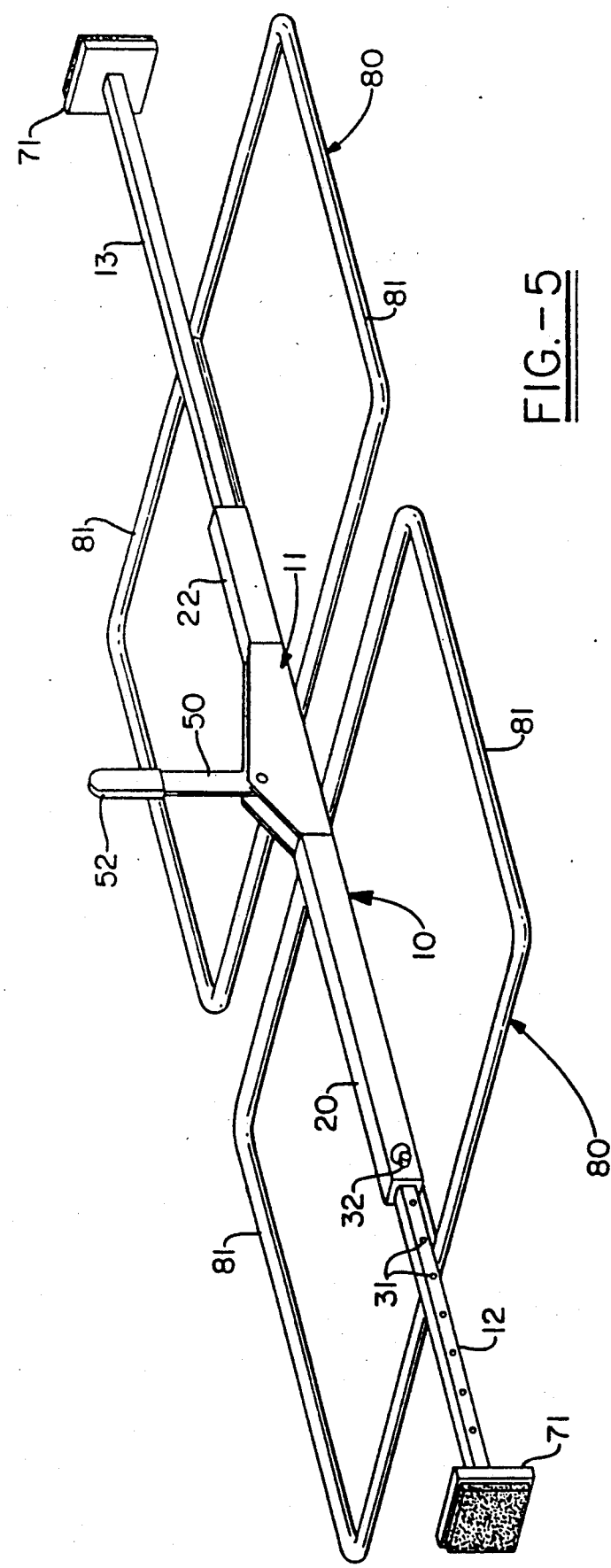
FIG. 5 is a load bar as in FIG. 1, and shown in use with an alternative embodiment of a header wall.

A load bar embodying the concepts of the present invention is generally indicated by the numeral 10 on the accompanying drawings. The load bar 10 has a main body or housing 11, a first arm 12, a second arm 13, and a cinch lock mechanism generally indicated by the numeral 14.

Main body 11 is substantially hollow, and has a first extension 20 terminating in a first open end 21, and a second extension 22 terminating in a second open end 23. First and second extensions 20 and 22 generally extend coaxially from main body 11.

First and second extensions 20 and 22 may be integrally formed with main body 11, or affixed thereto such as by welding. Further, first extension may be hingedly attached to main body 11, such as by hinge mechanism 20a.

First arm 12 is received within first open end 21 and second arm 13 is received within second open end 23. Preferably, first and second extensions 20 and 22 of main body 11, and first and second arms 12 and 13 are shaped as tubes and bars, respectively having widths substantially less than their lateral dimensions. As used herein with respect to the load bar 10, lateral is intended as left to right or right to left when viewing the device as shown in FIG. 1. Further, these same elements may be of varying cross sectional configurations such as round, square, triangular or the like, without departing from the spirit of the present invention.

As best shown in FIG. 2, first arm 12 is free to move in a lateral direction inside of first extension 20 of main body 11. Similarly, second arm 13 is also free to move in a lateral direction within the second extension 22 of main body 11. If desired, a stop ring 24 may be affixed to the end of first arm 12, and a corresponding stop ring may be affixed to the inside of first extension 20. First arm 12 is then limited in its lateral movement by the engagement of stop rings. The stop rings may also be pins, blocks or any other suitable device, as will be appreciated by one skilled in the art. Further, other means may be provided for limiting the ultimate lateral movement of either first or second arm 12, all of which are within the scope of the present invention.

There is provided the ability to adjust the lateral position of first arm 12 with respect to main body 11. This includes an aperture 30 proximal to the first open end 21. By proximal to open end 21, it is understood that aperture 30 is nearer open end 21 than is open end 23 of second extension 22. Further, first arm 12 is provided with a plurality of apertures 31 along its lateral dimension, such that each aperture 31 may be aligned with aperture 30 in first extension 20 of main body 12. A pin 32 may be inserted through aperture 30 and through the aligned aperture 31. With pin 32 so positioned, lateral movement of first arm 12 is prevented, and first arm 12 is effectively secured in place.

An operator may align any of the plurality of apertures 31 with aperture 30, such that the position of first arm 12 with respect to main body 11 may be adjusted and then secured by pin 32. The number of apertures 31 in first arm 12 is not critical. Further, while it is preferred that they be regularly spaced at certain intervals, this too is not critical to the practice of the invention. Further still, while apertures 30 and 31 and pin 32 represent a preferred embodiment, other adjusting mechanisms may be employed and still be within the scope of the present invention.

Second arm 13, which is received within second open end 23 of second extension 22, is also provided with the ability to be laterally adjusted with respect to main body 11, and is further adjustable with respect to first arm 12 when first arm 12 is secured as described above. This adjusting is preferably accomplished by a spring biased piston 40, which is manipulated by cinch lock 14. Piston 40 is received within an open end 41 within second arm 13, as best shown in FIG. 3. A distal stop pin 42 is positioned distal to open end 41 and with second arm 13. A pair of proximal stop pins 43 are positioned proximal to open end 41, such that distal stop pin 42 and proximal stop pins 43 define an area of second arm 13 therebetween.

Piston 40 is provided with a head portion 44 such that piston 40 and head portion 44 are "T-shaped" as shown in FIG. 3. Head portion 44 has a first side 45 and a second side 46, and is positioned within the area between and defined by distal pin 42 and proximal pins 43, such that piston 40 travels between proximal pins 43. Proximal pins 43 and head portion 44 are configured so that second side 46 of head portion 44 engages proximal pins 43, preventing head portion 44 and hence piston 40, from being removable from second arm 13. Accordingly, proximal pins 43 serve as stops for the piston head portion 44 while being spaced sufficiently apart to accommodate reciprocating movement of the piston or rod 40 therebetween.

A spring bias device, such as coil spring 47, is positioned within second arm 13, and within the area defined by distal stop pin 42 and proximal stop pins 43. One end 48 of coil spring 47 engages distal stop pin 42 and may even be affixed thereto. The other end 49 of coil spring 47 engages first, side 45 of the trailer employing the load bar 10 of head portion 44 of piston 40.

As will be discussed more fully hereinbelow, as cinch lock mechanism 14 is activated into the locked position, piston 40 will be caused to move in a lateral direction within second arm 13. This in turn will cause coil spring 47 to be compressed against distal stop pin 42, causing second arm 13 to itself be moved in a lateral direction within second extension 22 and away from first arm 12 and away from cinch lock mechanism 14. By providing a coil spring 47 with sufficient strength and bias force, first arm 13 will be held securely in place against a sidewall, as will also be more fully discussed below.

It will be appreciated by one skilled in the art that the adjusting of second arm 13 in a direction away from cinch lock 14 and away from first arm 12, may be accomplished by a variety of mechanisms other than piston 40, coil spring 47 and distal stop pin 42 as described above. All mechanisms which will accomplish adjustment of second arm 13 relative to main body 11 and first arm 12 are considered to be within the scope of the present invention.

Lateral movement of piston 40, and ultimately the securing of second arm 13 in its adjusted position, is accomplished by cinch lock mechanism 14. Cinch lock 14 is positioned within main housing 11, and includes a lever arm 50 and double hinge link 51. Both lever arm 50 and double hinge link 51 are in operative communication with piston 40 so as to effect lateral movement of piston 40, as will be discussed hereinbelow.

As shown in FIG. 6, lever arm 50 includes a handle portion 52 and a hooked end 53. Hooked end 53 is achieved by providing a bend 54, and a first pivot bore 55 is positioned at the approximate location of bend 54. A second pivot bore 56 is provided in hooked end 53. Main body 11 is also provided with a pivot bore 57 (FIG. 3). Lever arm 50 is positioned within substantially hollow main body 11, such that first pivot bore 55 of lever arm 50 aligns with pivot bore 57 of main body 11. A pivot pin 58 is positioned through pivot bore 57 of main body 11 and through first pivot bore 55 of lever arm 50. Thus, lever arm 50 is secured to main body 11, yet is free to pivot about pivot pin 58.

Double hinge link 51 preferably includes a first link plate 60 and a second link plate 61 (FIG. 3). Each link plate 60, 61 is provided with a pivot bore 62 at one end thereof. Pivot bores 62 of first and second link plates 60, 61 are aligned with second pivot bore 56 of lever arm 50, and a pivot pin 63 (FIG. 2) is positioned therethrough.

At the other end of link plates 60, 61 is second pivot bores 65 (FIG. 3). Further, piston 40 is provided with a pivot bore 66 at its end generally opposite that which includes head portion 44. Pivot bore 66 of piston 40 is aligned with pivot bores 65, and a pivot pin 67 is positioned therethrough.

As will be appreciated by those skilled in the art, lever arm 50 is free to pivot about pivot pin 58, such that handle portion 52 may be caused to travel in a direction toward or away from the main body 11. When handle portion 52 is caused to move toward main body 11, the operative communication with piston 40 causes piston 40 to move in a lateral direction within second arm 13 which, as described above, compresses coil spring 47 and causes second arm 13 to move in a direction away from main body 11 and away from first arm 12. This is accomplished by hooked end 53 exerting a force about pivot pin 63, causing double hinged link 51 to move in a direction toward piston 40. This in turn causes a force to be exerted upon pivot pin 67 and hence, upon piston 40 causing the lateral movement just described.

In the open position, as shown in FIG. 2, handle portion 50 has been caused to move away from main body 11, which provides operative communication with piston 40 in the reverse manner of that just described, so as to cause piston 40 to move away from distal stop pin 42, thus allowing coil spring 47 to decompress. This in turn will reduce the force exerted upon second arm 13.

The exact dimensions of the adjusting elements of the second arm 13 and cinch lock 14 are not critical to the present invention. However, it is preferred that lever arm 50, double hinge link 51, piston 40 and coil spring 47 be designed such that in the closed position, as shown in FIG. 1, spring bias force from coil spring 47 will, due to operative communication through double hinge link 51 and to lever arm 50, continually urge handle portion 52 in a direction toward main body 11. Thus, until handle portion 52 is manipulated in a direction away from main body 11, to an open position as shown in FIG. 2, the spring bias force exerted by coil spring 47 upon second arm 13 will be maintained.

In use, an operator positions load bar 10 in its approximate position, such as between the sidewalls 70 of a trailer compartment, as shown in FIG. 4. First arm 12 and second arm 13 terminate in ends which may be fitted with friction pads 71. With cinch lock 14 in the open position, the operator slides first arm 12 within extension 20 of main body 11 until both the first arm 12 and second arm 13 are just touching sidewalls 70 or are in close proximity thereto. The operator then secures the position of first arm 12 by inserting pin 32 through aperture 30 of the first extension 20 and through a selected aperture 31 of first arm 12. The load bar 10 is thus adjusted to approximate the desired length in which it is to be secured. As shown in FIG. 3, this length would be the approximate width between sidewalls 70.

Handle portion 52 of lever arm 50 is then pressed toward main body 11, causing second arm 13 to move in a lateral direction away from main body 11 and away from first arm 12 as described above.

It will be appreciated that in the locked position the friction pads 71 of both the first arm 12 and the second arm 13 will be tightly fitted against the sidewalls 70. By adjusting the spring bias force provided by coil spring 47, the strength of the actual fit may be varied; i.e., by using a stronger coil spring 47, the fit may be made stronger.

To remove the load bar 10, cinch lock 14 is moved to the open position by manipulating lever arm 50 away from main body 11. This causes piston 40 to move in a direction toward first arm 12. Head portion 44 of piston 40 also moves in a direction toward first arm 12, and engages proximal stop pins 43. This causes second arm 13 to also move in a direction toward first arm 12. The effective distance between first arm 12 and second arm 13 is thus reduced allowing load bar 10 to be removed from between sidewalls 70.

It is known that sidewalls 70 of tractor trailers will flex during transit. Because load arm 10 presents an arm, namely second arm 13, which is biased into contact with sidewalls 70, flexure of sidewalls 70 will be compensated by further compressing or decompressing of coil spring 47. If sidewalls 70 flex inward, coil spring 47 will compress and the fit of load bar 10 therebetween will be maintained. If sidewalls 70 flex outwardly, then coil spring 47 will decompress causing second arm 13 to move further away from main body 11 and first arm 12, and again the fit between sidewalls 70 will be maintained.

It will be appreciated that the preferred embodiment of the present invention disclosed herein may be varied within the scope of the present invention. For instance, a spring bias mechanism other than coil spring 47 may be employed in order to provide spring bias force. Stop pins 24, 25, 42 and 43 may be replaced with stop rings, blocks or the like. Other such variations, which may be made by a person skilled in the art based upon the disclosure made herein, are all within the scope of the present invention.

It may also be useful to provide a header wall used in conjunction with the load bar 10 as described above. For example, in FIG. 5, a header wall assembly 80 is depicted as being a plurality of arranged bars 81, affixed to main body 11. FIG. 3 depicts such a bulkhead assembly 80 in use in a trailer compartment having sidewalls 70, and securing a number of articles 82 arranged for transportation.

While the load bar 10 need not be used with a header wall, and may itself constitute a bulkhead, it may be employed with a variety of differing header wall assemblies either integrally formed with load bar 10 or affixed thereto. FIG. 5 depicts another header wall assembly 90 useful in conjunction with load bar 10. This header wall is made up of a number of loops 91, and is useful for smaller packing requirements.

It should thus be evident that a load bar for a variably positioned bulkhead is accomplished by the invention as disclosed above. Thus the invention disclosed herein and defined by the following claims accomplishes the objects of the present invention and otherwise constitutes an advantageous contribution to the art.

I claim:

1. A load bar comprising:
   a hollow main body having a first and second open end;
   a first arm received through said first open end of said main body and laterally movable within said main body;
   a second arm received through said second open end of said main body and also laterally movable within said main body;
   means to releasably secure and adjust the position of said first arm with respect to said main body; and
   means to releasably secure and adjust the position of said second arm with respect to said main body and with respect to said first arm, wherein said means to releasably secure and adjust the position of said second arm includes a lever action cinch lock having a lever in operative communication with said second arm by a double-hinge link between said lever and said second arm, said second arm being provided with a coil spring urging said second arm away from said main body, said coil spring being compressed by a piston in operative communication with said double-hinge link.

2. A load bar as in claim 1, wherein both said first and said second arms each have an end distal to said main body, which said distal ends are provided with friction pads.

3. A load bar as in claim 1, wherein said means to releasably secure and adjust the position of said first arm includes an aperture in said main body proximal said first open end.

4. A load bar as in claim 3, wherein said means to releasably secure and adjust the position of said first arm further includes a plurality of apertures in said first arm.

5. A load bar as in claim 4, wherein said apertures are alignable with said aperture in said main body.

6. A load bar as in claim 5, wherein said means to releasably secure and adjust the position of said first arm further includes pin means engageable with said aperture of said main body and said aperture of said first arm aligned with said aperture of said main body.

7. A load bar, comprising:
   a hollow main body having a first and second open end;
   a first arm received through said first open end of said main body and laterally movable within said main body;
   a second arm received through said second open end of said main body and also laterally movable within said main body;
   means to releasably secure and adjust the position of said first arm with respect to said main body; and
   means to releasably secure and adjust the position of said second arm with respect to said main body and with respect to said first arm, wherein said means to releasably secure and adjust the position of said second arm includes a lever action cinch lock having a lever in operative communication with said second arm by a double-hinge link between said lever and said second arm, said second arm being provided with a coil spring urging said second arm away from said main body, said link being hinged to said lever and to a piston said piston being in operative communication with said coil spring.

8. A load bar as in claim 7, wherein both said first and said second arms each have an end distal to said main body, which said distal ends are provided with friction pads.

9. A load bar as in claim 8, wherein said means to releasably secure and adjust the position of said first arm includes an aperture in said main body proximal said first open end.

10. A load bar as in claim 9, wherein said means to releasably secure and adjust the position of said first arm further includes a plurality of apertures in said first arm.

11. The load bar as in claim 10, wherein said apertures are alignable with said aperture in said main body.

12. The load bar as in claim 11, wherein said means to releasably secure and adjust the position of said first arm further includes pin means engageable with said aperture of said main body and said aperture of said first arm aligned with said aperture of said main body.

* * * * *